US008838367B1

(12) United States Patent
McAlister (10) Patent No.: US 8,838,367 B1
(45) Date of Patent: Sep. 16, 2014

(54) ROTATIONAL SENSOR AND CONTROLLER (71) Applicant: McAlister Technologies, LLC, Phoenix, AZ (US)

(72) Inventor: Roy Edward McAlister, Phoenix, AZ (US)

(73) Assignee: McAlister Technologies, LLC, Phoenix, AZ (US)

( * ) Notice: Subject to any disclaimer, the term of this patent is extended or adjusted under 35 U.S.C. 154(b) by 0 days.

(21) Appl. No.: 13/797,351

(22) Filed: Mar. 12, 2013

(51) Int. Cl.
G06F 19/00 (2011.01)
F02D 45/00 (2006.01)

(52) U.S. Cl.
CPC .................................. F02D 45/00 (2013.01)
USPC .......................................................... 701/110

(58) Field of Classification Search
USPC ..................... 123/319, 320, 339.19, 352, 494,
123/406.24, 350, 357, 363, 370; 701/110;
324/207.25, 207.11, 207.2; 73/114.04,
73/114.05
See application file for complete search history.

(56) References Cited

U.S. PATENT DOCUMENTS

| 1,037,437 | A | 9/1912 | Chase |
| 1,310,565 | A | 7/1919 | Grunwald |
| 1,401,612 | A | 12/1921 | Landgrebe |
| 1,451,384 | A | 4/1923 | Whyte |
| 1,693,931 | A | 12/1928 | Lowe |
| 1,765,237 | A | 6/1930 | King |
| 1,773,995 | A | 8/1930 | Goldsborough |
| 2,255,203 | A | 9/1941 | Wiegand |
| 2,391,220 | A | 12/1945 | Beeh |
| 2,459,286 | A | 1/1949 | Wiegand et al. |
| 2,826,395 | A | 3/1958 | Petty |
| 3,060,912 | A | 10/1962 | May |
| 3,094,974 | A | 6/1963 | Barber |
| 3,173,409 | A | 3/1965 | Warren |
| 3,266,234 | A | 8/1966 | Cook |
| 3,315,650 | A | 4/1967 | Bishop et al. |
| 3,373,724 | A | 3/1968 | Papst |
| 3,682,142 | A | 8/1972 | Newkirk |

(Continued)

FOREIGN PATENT DOCUMENTS

DE 241047 A1 9/1975
DE 3151368 A1 8/1982

(Continued)

OTHER PUBLICATIONS

"Clean, Efficient and Lightweight Propulsion Systems for a Better World," EcoMotors International, Accessed May 19, 2011, http://www.ecomotors.com. 2 pages.

(Continued)

Primary Examiner — Stephen K Cronin
Assistant Examiner — Elizabeth Hadley
(74) Attorney, Agent, or Firm — Perkins Coie LLP (57) ABSTRACT Engine control systems having rotational sensors and controllers, and associated methods and systems, are disclosed herein. An engine control system in accordance with a particular embodiment can include a drum operably coupled to a rotating shaft of an engine. The drum can include a pattern positioned on its surface and a sensor can be positioned proximate to the drum to read the pattern and/or write a new pattern. A rod can operably couple the drum to an engine input mechanism and operate to axially move the drum. The axial movement of the drum can shift the pattern to different portions, resulting in a change in the timing for an engine event.

20 Claims, 5 Drawing Sheets

(56) References Cited

U.S. PATENT DOCUMENTS

| | | | |
|---|---|---|---|
| 3,754,841 | A | 8/1973 | Grabb et al. |
| 3,792,762 | A | 2/1974 | Ball et al. |
| 3,815,555 | A | 6/1974 | Tubeuf |
| 3,829,368 | A | 8/1974 | Wesley |
| 3,830,204 | A | 8/1974 | McAlister |
| 3,908,625 | A | 9/1975 | Romy |
| 3,926,169 | A | 12/1975 | Leshner et al. |
| 3,976,034 | A | 8/1976 | Shinohara et al. |
| 3,980,061 | A | 9/1976 | McAlister |
| 4,003,343 | A | 1/1977 | Lee |
| 4,020,803 | A | 5/1977 | Thuren et al. |
| 4,041,910 | A | 8/1977 | Houseman |
| 4,046,522 | A | 9/1977 | Chen et al. |
| 4,066,046 | A | 1/1978 | McAlister |
| 4,086,877 | A | 5/1978 | Henkel et al. |
| 4,086,878 | A | 5/1978 | Eisele et al. |
| 4,099,489 | A | 7/1978 | Bradley |
| 4,108,114 | A | 8/1978 | Kosaka et al. |
| 4,109,461 | A | 8/1978 | Fujitani et al. |
| 4,111,160 | A | 9/1978 | Talenti |
| 4,140,090 | A | 2/1979 | Lindberg |
| 4,161,657 | A | 7/1979 | Shaffer, Jr. |
| 4,165,616 | A | 8/1979 | Pierpoline |
| 4,181,100 | A | 1/1980 | Yamane et al. |
| 4,211,200 | A | 7/1980 | Rocchio et al. |
| 4,235,533 | A | 11/1980 | Norris |
| 4,244,330 | A | 1/1981 | Baugh et al. |
| 4,249,386 | A | 2/1981 | Smith et al. |
| 4,253,428 | A | 3/1981 | Billings et al. |
| 4,340,013 | A | 7/1982 | Lindstrom |
| 4,362,137 | A | 12/1982 | O'Hare |
| 4,373,671 | A | 2/1983 | Giardini |
| 4,376,097 | A | 3/1983 | Emelock |
| 4,381,740 | A | 5/1983 | Crocker |
| 4,382,189 | A | 5/1983 | Wilson |
| 4,408,595 | A | 10/1983 | Broyles et al. |
| 4,418,653 | A | 12/1983 | Yoon |
| 4,441,469 | A | 4/1984 | Wilke |
| 4,442,801 | A | 4/1984 | Glynn et al. |
| 4,475,484 | A | 10/1984 | Filho et al. |
| 4,503,813 | A | 3/1985 | Lindberg |
| 4,515,135 | A | 5/1985 | Glass |
| 4,547,356 | A | 10/1985 | Papineau |
| 4,603,671 | A | 8/1986 | Yoshinaga et al. |
| 4,606,308 | A | 8/1986 | Furlong |
| 4,642,992 | A | 2/1987 | Julovich |
| 4,656,993 | A * | 4/1987 | Yuzawa et al. ............ 123/617 |
| 4,663,938 | A | 5/1987 | Colgate |
| 4,716,859 | A | 1/1988 | Konig et al. |
| 4,722,303 | A | 2/1988 | Leonhard |
| 4,744,343 | A * | 5/1988 | Bisenius et al. ............ 123/476 |
| 4,768,341 | A | 9/1988 | Nozaki et al. |
| 4,783,966 | A | 11/1988 | Aldrich |
| 4,834,033 | A | 5/1989 | Larsen |
| 4,839,247 | A | 6/1989 | Levy et al. |
| 4,890,528 | A * | 1/1990 | Kamijima .................. 84/95.2 |
| 4,918,916 | A | 4/1990 | Tiberg |
| 4,967,708 | A | 11/1990 | Linder et al. |
| 4,971,009 | A | 11/1990 | Washino et al. |
| 4,982,708 | A | 1/1991 | Stutzenberger |
| 5,010,734 | A | 4/1991 | Ho |
| 5,067,467 | A | 11/1991 | Hill et al. |
| 5,108,266 | A | 4/1992 | Hewitt |
| 5,115,771 | A | 5/1992 | Ozawa |
| 5,149,600 | A | 9/1992 | Yamase et al. |
| 5,150,668 | A | 9/1992 | Bock |
| 5,153,834 | A | 10/1992 | Abo et al. |
| 5,183,011 | A | 2/1993 | Fujii et al. |
| 5,207,185 | A | 5/1993 | Greiner et al. |
| 5,218,941 | A | 6/1993 | Suzuki et al. |
| 5,222,481 | A | 6/1993 | Morikawa |
| 5,228,293 | A | 7/1993 | Vitale |
| 5,229,977 | A | 7/1993 | Owen |
| 5,261,238 | A | 11/1993 | Olsen |
| 5,279,260 | A | 1/1994 | Munday |
| 5,305,714 | A | 4/1994 | Sekiguchi et al. |
| 5,321,980 | A * | 6/1994 | Hering et al. ............ 73/114.36 |
| 5,343,699 | A | 9/1994 | McAlister |
| 5,357,908 | A | 10/1994 | Sung et al. |
| 5,394,852 | A | 3/1995 | McAlister |
| 5,399,251 | A | 3/1995 | Nakamats |
| 5,488,932 | A | 2/1996 | Serafini |
| 5,497,744 | A | 3/1996 | Nagaosa et al. |
| 5,505,824 | A | 4/1996 | McElroy |
| 5,512,145 | A | 4/1996 | Hollenberg |
| 5,522,358 | A | 6/1996 | Clarke |
| 5,531,199 | A | 7/1996 | Bryant et al. |
| 5,566,450 | A | 10/1996 | Rao et al. |
| 5,632,870 | A | 5/1997 | Kucherov |
| 5,676,096 | A | 10/1997 | Nishi et al. |
| 5,692,458 | A | 12/1997 | Green |
| 5,715,788 | A | 2/1998 | Tarr et al. |
| 5,824,890 | A * | 10/1998 | La Palm et al. ............ 73/114.04 |
| 5,837,110 | A | 11/1998 | Dean |
| 5,899,071 | A | 5/1999 | Stone et al. |
| 5,900,330 | A | 5/1999 | Kagatani |
| 5,910,773 | A | 6/1999 | Brownlee |
| 5,983,855 | A | 11/1999 | Benedikt et al. |
| 5,991,670 | A | 11/1999 | Mufford et al. |
| 6,155,212 | A | 12/2000 | McAlister |
| 6,172,500 | B1 * | 1/2001 | Bicking .................. 324/207.22 |
| 6,239,336 | B1 * | 5/2001 | Orii et al. .................. 84/95.1 |
| 6,260,546 | B1 | 7/2001 | Vaughn |
| 6,289,869 | B1 | 9/2001 | Elliott |
| 6,341,591 | B1 | 1/2002 | Tsutsumi et al. |
| 6,446,597 | B1 | 9/2002 | McAlister |
| 6,463,889 | B2 | 10/2002 | Reddy |
| 6,640,778 | B1 * | 11/2003 | Hori .................. 123/406.62 |
| 6,756,140 | B1 | 6/2004 | McAlister |
| 6,787,258 | B2 | 9/2004 | Prerad |
| 6,799,541 | B1 | 10/2004 | Clinton et al. |
| 6,945,208 | B2 * | 9/2005 | Yonezawa et al. ......... 123/179.5 |
| 7,159,544 | B1 | 1/2007 | Studdert et al. |
| 7,191,738 | B2 | 3/2007 | Shkolnik |
| 7,267,106 | B2 * | 9/2007 | Adachi et al. .................. 123/436 |
| 7,290,506 | B2 | 11/2007 | Rau, III et al. |
| 7,451,728 | B1 * | 11/2008 | Geer .................. 123/90.11 |
| 7,628,137 | B1 | 12/2009 | McAlister |
| 7,785,451 | B2 | 8/2010 | Lin et al. |
| 7,927,434 | B2 | 4/2011 | Nakamura et al. |
| 8,026,288 | B2 | 9/2011 | Takenouchi et al. |
| 8,051,944 | B2 * | 11/2011 | Nakatsu .................. 180/444 |
| 2003/0012985 | A1 | 1/2003 | McAlister |
| 2004/0045823 | A1 | 3/2004 | Kawase et al. |
| 2004/0163954 | A1 | 8/2004 | Gurry et al. |
| 2006/0060468 | A1 | 3/2006 | Weinand |
| 2006/0213760 | A1 | 9/2006 | Tao et al. |
| 2007/0062813 | A1 | 3/2007 | Gentalen et al. |
| 2007/0221500 | A1 | 9/2007 | Hausselt et al. |
| 2008/0047831 | A1 | 2/2008 | Richert et al. |
| 2009/0065438 | A1 | 3/2009 | Chau |
| 2009/0199828 | A1 | 8/2009 | Luttgeharm |
| 2010/0122688 | A1 * | 5/2010 | Sihler et al. .................. 123/350 |
| 2010/0263619 | A1 | 10/2010 | Reymond et al. |

FOREIGN PATENT DOCUMENTS

| | | | |
|---|---|---|---|
| DE | 3443022 | A1 | 5/1986 |
| FR | 2262195 | A1 | 9/1975 |
| GB | 1002694 | A | 8/1965 |
| GB | 1038490 | A | 8/1966 |
| GB | 1336636 | A | 11/1973 |
| GB | 2112455 | A | 7/1983 |
| WO | WO-95/27845 | A1 | 10/1995 |

OTHER PUBLICATIONS

Collier Technologies Technology Description; "HCNG"; Nov. 2005; 4 pages.

Davis et al., "Fuel Injection and Positive Ignition-A Basis for Improved Efficiency and Economy", SAE Progress in Technology Review vol. II, Society of Automotive Engineers, 1967, pp. 343-357.

Finegold, et al., "Dissociated Methanol as a Consumable Hydride for Automobiles and Gas Turbines", Jun. 1982, pp. 1359-1369.

(56) References Cited

OTHER PUBLICATIONS

Finsterwalder, "Deutz Converts Operation by Adding High-Tension Ignition System", Automotive Engineering, Dec. 1971, pp. 28-32.
James W. Heffel, University of California; "Hydrogen Powered Shelby Cobra: Vehicle Conversion"; 2003; 14 pages.
Jim Stanam; "How Can Engines Be Modified to Run Using Alternative Fuels?"; Lockheed Martin; Orlando, FL; Jan. 2, 1999, 4 pages.
Robert Priest, Appeal T 383/04-3.2.4 in respect of European Patent Application No. 94920655.1-2311 of Roy E. McAlister; "Declaration of Robert Priest"; Nov. 30, 2005; 3 pages.
Schwartz, Ariel, "Bill Gates, Khosla Ventures Inejct $23.5 Million Into Engine Startup EcoMotors," FastCompany, Jul. 12, 2010, Accessed May 31, 2011, http://www.fastcompany.com/1669471/bill-gates-khosla-ventures-inject-235-million-into-efficient-engine-startup-ecomotors. 2 pages.
Simko et al., "Exhaust Emission Control by the Ford Programmed Combustion Process-PROCO", SAE Paper No. 720052, pp. 249-264.
Charles W. Lopez, Kenneth W. Stone; Contractor Report; Performance of the Southern California Edison Company Stirling Dish; Oct. 1993.

\* cited by examiner

ROTATIONAL SENSOR AND CONTROLLER

TECHNICAL FIELD

The present disclosure relates generally to sensors and controllers. More specifically, rotational sensors for monitoring engine parameters and controlling or modifying engine operation are disclosed herein.

BACKGROUND

Various control systems have been developed to aid in the operation of engines. For example, in many internal combustion engines, several aspects of engine operation are controlled by an electronic control unit (ECU) that executes software to respond to engine parameters or operator inputs. ECUs can control fuel injection, valve timing, turbocharger operation, and many other engine systems or components. Additionally, ECUs can respond to data provided by sensors that monitor engine parameters, e.g., ECUs can respond to a signal from a throttle position sensor and adjust the timing of spark signals and fuel injection.

Although ECUs and other electronic engine control systems have been widely adopted, they suffer from several drawbacks. For example, the integration of an ECU with a new engine can require extensive software development and experimentation that can add substantial development costs. Changes to an engine's design or components can require major revisions to the software and add additional costs. Additionally, software bugs can cause an ECU to produce undesired engine operation. These bugs can result in sudden acceleration, stalling and other erroneous engine operation, accidents, engine damage, problematic emissions, costly recalls and/or many other aspects of poor engine performance. Furthermore, ECUs can be prone to failure as a result of their complex design and reliance on sensitive electronic components. For example, most ECU modules include microprocessors, printed circuit boards and other sensitive electronic components. These components can be susceptible to failure from heat, moisture, vibration or other conditions that are common to engine operating environments.

BRIEF DESCRIPTION OF THE DRAWINGS

Certain details are set forth in the following description and in FIGS. 1A-4C to provide a thorough understanding of various embodiments of the disclosure. Other details describing well-known structures and systems often associated with heat engines, internal combustion engines, etc., have not been set forth in the following disclosure to avoid unnecessarily obscuring the description of the various embodiments of the disclosure.

Many of the details, dimensions, angles and other features shown in the Figures are merely illustrative of particular embodiments of the disclosure. Accordingly, other embodiments can have other details, dimensions, angles and features without departing from the spirit or scope of the present invention. In addition, those of ordinary skill in the art will appreciate that further embodiments of the invention can be practiced without several of the details described below.

In the Figures, identical reference numbers identify identical, or at least generally similar, elements. To facilitate the discussion of any particular element, the most significant digit or digits of any reference number refers to the Figure in which that element is first introduced. For example, element 120 is first introduced and discussed with reference to FIG. 1.

DETAILED DESCRIPTION

The present technology includes various embodiments of systems and methods for engine operation and control. Embodiments in accordance with the present technology can include systems for controlling the operation of fuel pumps, pressure or flow regulators, injectors, spark plugs, thermochemical regenerative systems, and/or other engine and driveline components. In one embodiment, an engine control system can determine engine parameters and adjust engine operation to increase fuel efficiency and minimize generation of harmful emissions. In some embodiments, control systems can be used to regulate magneto-ion-dynamic (MID) thrusting (or other thrusting) of ions in a combustion chamber. In certain embodiments control of corona ignition is provided.

Conventional spark-plug-ignited homogeneous-charge engines are less efficient than stratified-charge diesel engines because of greater heat losses to the cooling system through the combustion chamber and the slower combustion of hydrocarbons such as gasoline in lower compression ratio engines. Operation of spark-plug ignited homogeneous-charge engines with natural gas (methane) suffers greater heat losses and lower thermodynamic cycle efficiency because homogeneous charge natural gas burns slower than gasoline. Natural gas occupies more volume in homogenous charge mixtures than gasoline and causes a greater loss of volumetric efficiency and consequent loss of performance and power.

In operation, spark-plug ignited homogeneous mixtures of fuel and air require a small portion of an ignitable mixture to be presented within the spark plug gap which is typically less than 1.7 mm (0.07"). This represents a volume of less than 5 mm$^3$ (0.0003 in$^3$). Compared to the remaining mixture of fuel and air in a volume that may be more than 6000 mm$^3$ (0.5 in$^3$) the spark-plug has access to ionize less than 1 part of more than 1200 parts of mixture. This small amount of spark heated ionized gas must then establish propagation of a self-sustaining flame front that grows more or less radially outward. However the flame speed is slowed by heat transfers to the spark-plug electrodes, surrounding combustion chamber walls that are liquid cooled, and to the interface with the remaining fuel-air mixture.

Depending upon the richness of the fuel-air mixture and turbulence (rich, turbulent fuel-air mixtures burn faster than lean laminar mixtures) the resulting speed of the sub-sonic flame front typically averages between 15 and less than 30 meters/second. Increased pressure conditions (typical to higher compression ratios and/or supercharging) can also expedite the flame front. However, such flame-speed limitations require long-lead spark-plug ignition at piston positions during the compression stroke that are far before top dead center (TDC), which increases the time for adverse heat losses, produces negative work, and reduces output torque. Portions of the fuel-air mixtures near combustion chamber walls burn at much lower velocities or are quenched to cause unburned fuel constituents to enter the exhaust stream. Unburned hydrocarbon fuel substances include hydrocarbons and carbon monoxide.

Other portions of the fuel air mixture in the hottest central zone reach peak temperatures exceeding 2200° C. (4000° F.) and cause oxides of nitrogen to be formed. Although hot oxides of nitrogen are less stable than diatomic oxygen or nitrogen such oxides of nitrogen may be retained by quenching near cooled combustion chamber surfaces and become part of the exhaust gas mixture that leaves the combustion chamber upon opening of the exhaust valves.

Embodiments of the present invention overcome the problems caused by conventionally controlled spark-plug ignited mixtures of fuel and air. Combinations of adaptively controlled operations include:

1) Inlet oxidant such as air is admitted into the combustion chamber without throttling. There is no vacuum in the intake system and compared to homogeneous-charge engine operation, more air is available for supporting production of more combustion energy.
2) Fuel is directly injected to form a stratified charge after the combustion chamber is closed to overcome volumetric efficiency losses required by homogeneous charge operation.
3) Surplus air provides insulation of the flame front to reduce or eliminate quenching and production of unburned fuel substances.
4) A relatively small portion of the air from the combustion chamber may be ionized or reacted to produce chemically activated substances such as ozone and oxides of nitrogen that are presented as a stratified charge of chemically activated oxidants just before injection of fuel and/or chemically activated fuel agents. Thus the stratified charge fuel-oxidant flame front can proceed far faster with less quenching losses than provided by conventional Diesel or homogeneous charge systems.
5) Surplus air that is heated by the products of combustion provides favorable production of expansive work instead of allowing heat to be lost to the combustion chamber components and cooling system.
6) Higher volumetric efficiency of the primary engine provides greater volume and rate of exhaust gas delivery to a secondary engine such as a gas turbine or turbo motor as in turbocharged engines. This improves turbocharger efficiency and more air is delivered to the combustion chambers of the primary engine.
7) Fuel is presented as a stratified charge fuel-oxidant mixture within surplus air.
8) Fuel may be presented as chemically activated ions, free radicals, heated or otherwise more aggressive reactants with the oxidant such as air or stratified charges of chemically activated oxidant.
9) The pattern of fuel and/or oxidant projections into the combustion chamber can be adjusted to optimize operations with widely varying fuel types at start-up, idle, acceleration, cruise, and full power requirements of combustion engines. Projected fuel pattern adjustments can be controlled by variation of the pressure drop from the injector to the combustion chamber and/or by the electrical and/or chemical reaction acceleration of fuel particles.

Improvements over diesel fuel ignition by compression of air include the ability by present embodiments to utilize far less electrical and/or chemical plasma generation energy to provide much faster beginning and completion of combustion. This avoids the far greater energy requirements to rapidly heat air by mechanical compression and to mechanically pump liquid diesel fuel to very high pressures (20,000 to 30,000 PSIA) for injection of liquid fuel droplets that must penetrate hot air for gaining sufficient heat to evaporate and to penetrate more hot air to become chemically cracked or broken into fragments that begin to support self-sustaining chain reactions. Faster beginning and completion of combustion essentially establishes constant-volume heat addition for subsequent expansion of combustion gases within surplus air and is thermodynamically more efficient than constant-pressure heat addition typical to idealized diesel engine operation with compression ignition.

Even faster beginning and completion of combustion is achieved with hydrogen-characterized fuels such as thermochemically converted substances as shown in Equations 1, 2, and 3 below. Thus in addition to delivering more energy to the combustion chamber than the original hydrocarbon, the thermochemically-regenerated (TCR) hydrogen-characterized fuel provides even higher energy conversion efficiency.

Figure 1A:
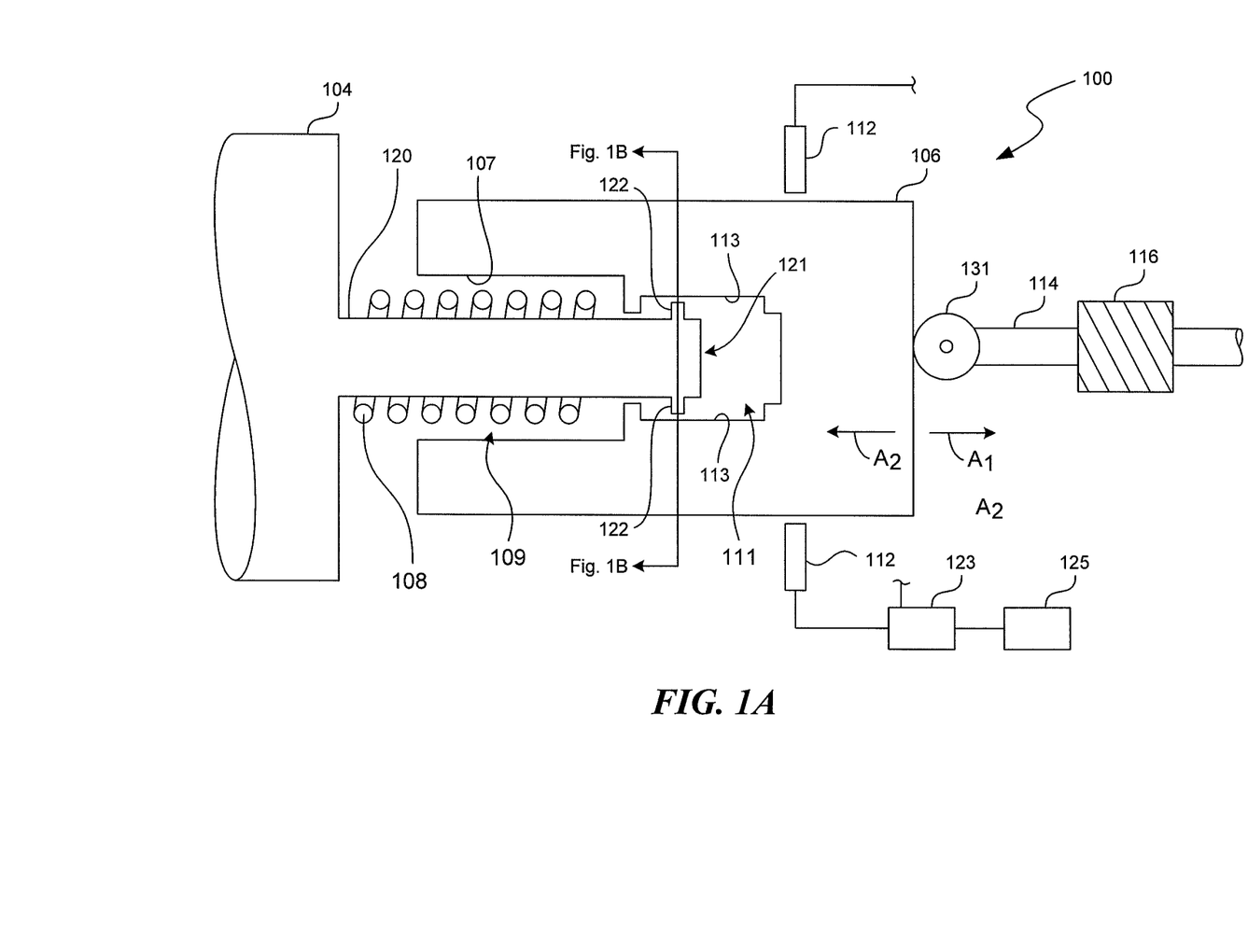
FIG. 1A is a partially schematic, cross-sectional view of a portion of an engine control system configured in accordance with the present disclosure.

FIG. 1A is a partially schematic, cross-sectional view of a portion of an engine control system or controller 100 configured in accordance with an embodiment of the present disclosure. In the illustrated embodiment, the engine control system 100 includes a rotatable component, e.g., a cylindrical drum 106, operably coupled to a shaft 104. The shaft 104 can be a cam shaft or another suitable rotational component such as a crank shaft, timing gear, or cog-wheel of a timing belt assembly of a combustion engine. The drum 106 may include glass, ceramic, polymer, and/or a metal or metal alloy such as a suitable aluminum alloy. In the illustrated embodiment, the drum 106 includes a cylindrical bore or opening 107 configured to engage with an extension 120 of the shaft 104. The opening 107 includes a spring receiving portion 109 and a coupling portion 111. A pair of grooves or slots 113 can extend along at least a section of the coupling portion 111. A pair of opposing pins 122 can extend from a distal portion 121 of the extension 120 and engage the slots 113. A biasing magnet and/or an extension or compression spring 108 can be positioned at least partially within the spring receiving portion and bias the drum 106 in a desired direction such as the direction of arrow A1.

The engine control system 100 can include a rod 114 having one or more roller bearings 131. The rod 114 can be operably coupled to an engine input mechanism, e.g., an acceleration peddle, automatic pilot, or cruise control assembly, and can move in the direction of arrows A1 and A2 in response to operator inputs to the engine. The rod 114 is positioned to engage the drum 106 with the roller bearings 131 and urge the drum 106 in the direction of arrow A2. The rod 114 can include a low friction linkage 116 (e.g., a thrust bearing) to minimize energy losses from friction and heat. One or more sensors 112 can be positioned adjacent to a surface 127 of the drum 106 and can be operably coupled to an electrical circuit (e.g., a controller 123, shown schematically) and one or more engine components 125 (shown schematically). In many applications, the sensors 112 can trigger suitable relays to directly power fuel injection actuation by hydraulic, pneumatic, magnetostrictive, electromagnetic, or piezoelectric systems and/or ignition actuation by suitable ignition systems such as hot surface, spark, Lorentz thrust and/or corona systems. In other applications, for example, the electrical circuit or controller 123 can include an ignition circuit and the engine component 125 can be an ignition device (e.g., a spark plug). In another embodiment, the controller 123 can include a fuel injection controller and the engine component can include a fuel injector. In another embodiment the controller 123 can include a fuel pressure controller and the engine component 125 can include a pressure regulator. In another embodiment the controller 123 can include a fuel pressurization controller and the engine component 125 can be a fuel pump or compressor. In another embodiment the controller 123 can include an automatic transmission controller and the engine component 125 can include an automatic transmission. In another embodiment, the controller 123 can include a thermochemical reactor process controller and the engine component 125 can include a thermochemical process reactor to harvest or otherwise regenerate heat and/or electrical energy production potentials that are normally wasted into chemical and/or pressure fuel values. Signals from the sensors 112 can be filtered and amplified as needed and actuate relays, switches, and/or other electrical components to provide power to motors, solenoids, magnetostrictive or piezoelectric valve operators and ignition circuits in accordance with practices known in the art. Additionally, voltage control for applications such as piezoelectric drivers, pulse-width modulation for applications such as heaters and motor or solenoid drivers, and/or other techniques for optimization of injection and ignition functions of an engine can be employed in conjunction with the engine control system 100. Furthermore, the controller 123 can include one or more power supplies, printed circuit boards, processors, memory, communication devices (e.g., input/output devices, wireless transceivers, fiber-optics, antennas, or other devices capable of wired and/or wireless communication with other components), and various other suitable electronic components. Furthermore, cables, wires, connectors and other suitable components can be integral with or operably coupled to the controller 123 to provide or distribute power, control signals, and/or other electronic signals.

The sensors 112 can include photo-optic devices, e.g., Hall-effect or other suitable sensors, and can measure or determine various engine parameters or conditions and/or initiate various engine events, as will be further described below. In some embodiments, each combustion chamber can have one or more suitable detectors such as Hall-effect sensors 112 to detect e.g., piston position, velocity and/or acceleration and provide the desired timing of one or more fuel injections, one or more ignition events, and/or other control features (e.g., corona ignition and/or Lorentz acceleration of ionized particles or magneto-ion-dynamic "MID" thrust).

Figure 1B:
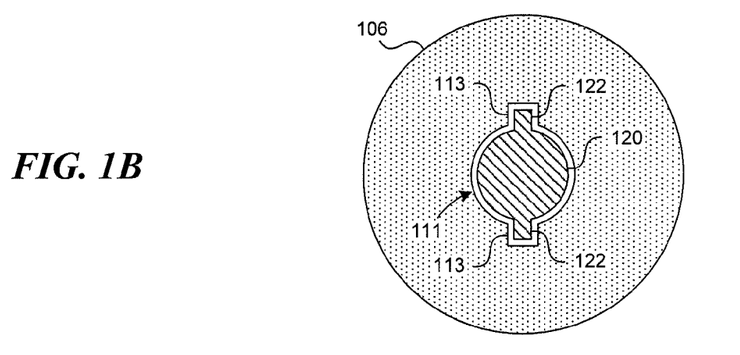
FIG. 1B is a cross sectional view of a portion of an engine control system configured in accordance with the present disclosure.

FIG. 1B is a cross sectional view taken at the plane 1B of FIG. 1A. In the illustrated embodiment, the slots 113 are positioned on opposing sides of the coupling portion 111 and extend through the drum 106 in a direction parallel to the arrows A1 and A2 of FIG. 1A. In some embodiments, the coupling portion can include one or more additional slots 113. The slots 113 can extend through the coupling portion at an angle to the arrows A1 and A2. Additionally, the slots 113 can extend through the coupling portion in a helical pattern of a fixed or varying pitch, or in other patterns.

Figure 2A:
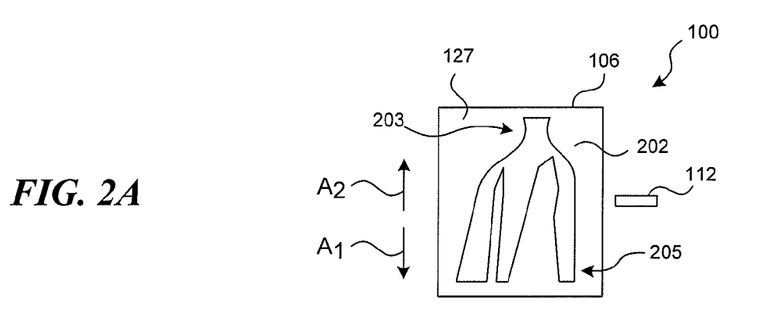
FIGS. 2A and 2B are side views of drums having signal patterns configured in accordance with the present disclosure.
Figure 2B:
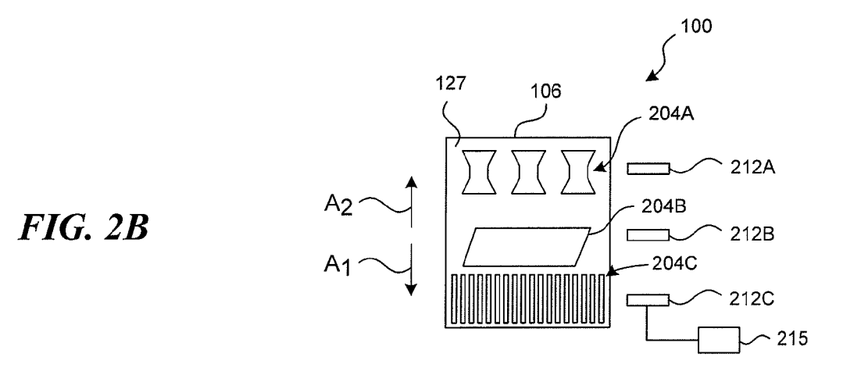

The drum 106 can include one or more signaling characteristics that interact with the sensor 112 and/or other sensors. FIGS. 2A and 2B are partially schematic side views of a suitable drum such as a portion of the drum 106 having signal patterns 202, 204 configured in accordance with the present disclosure. In the illustrated embodiment of FIG. 2A, the drum 106 includes a single signal pattern 202, and a single sensor 112 is positioned proximate to the surface 127 to detect or otherwise interact with the pattern 202. In the illustrated embodiment of FIG. 2B, the drum 106 includes three individual signal patterns 204 (identified individually as signal patterns 204A-204C), and three individual sensors (identified individually as sensors 212A-212C) are positioned proximate to the surface 127. The sensors 212 can be connected to a variety of electrical circuits or components. For example, in the illustrated embodiment, the sensor 212C is operably connected to an engine monitoring system 215. The engine monitoring system 215 can include a variety of electrical, mechanical and/or electromechanical components, including any of the components described above with respect to the controller 123. The patterns 202, 204 can include materials exhibiting a variety of suitable optical, magnetic or electromagnetic properties that can be read (e.g., detected, sensed, etc.) by the sensors 112, 212. In some embodiments, the patterns 202, 204 can include cut-outs or etched sections of an otherwise ferromagnetic material. In other embodiments, the drum 106 can include ferromagnetic ink or plating of patterns or features on a suitable non-magnetic material.

In some embodiments, the sensors 112, 212 can include light-emitting diodes (LEDs) and/or optical sensors, and the patterns 202, 204 can consist of material having a variety of colors. For example, light sources integral with or separate from the sensors 112, 212 can emit light of a particular frequency and the drum 106 can reflect differing frequencies of light depending on the portion of the pattern 202, 204 located proximate to the sensors 112, 212. The frequencies received by the sensors 112, 212 can correspond to different engine events, as further described below. In one embodiment, the sensors 112, 212 can be Hall-effect sensors, and the patterns 202, 204 can include materials having magnetic properties that can be detected by the sensors 112, 212.

In operation, referring to FIGS. 1A-2B, the interaction of the pins 122 with the slots 113 translates rotation of the shaft 104 into rotation of the drum 106. As the drum 106 rotates, the patterns 202, 204 rotate past the sensors 112, 212 and the sensors receive signals based on the rotation of the patterns. Absent any operator input for increased engine speed, the drum 106 is biased by the spring 108 in the direction of arrow A1 to an idle position. An input to the engine to increase speed or revolutions per minute moves the rod 114 in the direction of arrow A2, and consequently urges the drum 106 in the direction of arrow A2. As the drum 106 moves in the direction of A2, the patterns 202, 204 shift with the drum movement such that a different portion of the pattern 202, 204 is interacting with the sensors 112, 212. The shift in the patterns can correspond to a variety of different engine events. For example, in the illustrated embodiment of FIG. 2A, the pattern 202 includes a first or continuous portion 203 and a second or discontinuous portion 205 having multiple individual sections. In one embodiment, the pattern 202 can be used to control the fuel injection of an engine. At idle, the sensor 212 can detect the continuous portion 203 rotating past the sensor 212, and the sensor 212 can send signals to a fuel injector to inject fuel continuously during this "on-time" period. Accordingly, the continuous or first portion of the pattern 202 can correspond to a first engine event (e.g., engine idling and single-burst fuel injection). As the engine speeds up, the drum 106 shifts, moving the pattern 202 such that the discontinuous portion 205 rotates past the sensor 212. In the illustrated embodiment, the multiple sections of the discontinuous portion 205 can correspond to multiple separate injections of fuel into the engine for a single stroke of a piston (e.g., a single fuel injection cycle). Accordingly, the engine control system 100 can provide multi-burst fuel injection. Hence, the discontinuous or second portion of the pattern 202 can correspond to a second engine event (e.g., multi-burst fuel injection). In some embodiments, increased torque to meet occasional loads such as power steering and/or air-conditioning or air-compressor loads can be accomplished by operation within the continuous portion 203 (e.g., movement to an area of the continuous portion that corresponds to a longer on-time).

The patterns 202, 204 can include a variety of suitable geometries, shapes and configurations depending on the engine event or monitoring for which they are configured. For example, the patterns 202, 204 can include linearly sloped portions, curved portions, triangular portions, square portions and/or any other suitable shape or configuration. Additionally, although the term portion has been used to describe part of a particular unitary pattern, a portion of a pattern can also represent an independent section that is not connected to another section of the pattern. Furthermore, although the discussion above referred to the first portion of a particular pattern corresponding to a particular engine event, and a second portion of the particular pattern as corresponding to a different engine event, in some embodiments, different portions of a pattern can correspond to the same engine event (e.g., shorter or longer duration of a valve opening).

In a manner generally similar to the fuel injection discussed above, the pattern 202 can additionally, or alternatively, control another function such as ignition for an engine. For example, the continuous portion 203 and the discontinuous portion 205 can provide indications to the sensor 112 that can generate the firing of one or more spark plugs. In some embodiments, the patterns can generate multiple ignition events for each fuel injection cycle and/or each individual injection of fuel. In one embodiment, the pattern 202 can include multiple colors that correspond to signals for fuel injection and/or ignition. Accordingly, one or more patterns on the drum 106 can provide multi-burst fuel injection with multiple ignition events for each injection of fuel along with other interactive events such as piston deceleration and increased or decreased boost pressure from a turbocharger and increased or decreased fuel pressure.

As discussed above, the sensors 112, 212 can receive and respond to multiple frequencies of light. In one embodiment, differing frequencies received by the sensors 112, 212 can correspond to differing types of fuel that can be injected or admitted into the engine. For example, an engine can be provided with multiple fuels and the receipt of a particular frequency or wavelength of light can initiate the addition of one or more fuels. In one example, the receipt of UV wavelengths can correspond to hydrogen fuel, violet wavelengths can correspond to mixtures of 40% to 90% hydrogen (with methane as the remainder), red wavelengths for mixtures of 5% to 40% hydrogen (with methane as the remainder), green for methane, blue for propane, near IR for methanol, middle IR for ethanol, etc. The sensors 112, 212 (or other emission sources) can emit a range of frequencies and the signal patterns 202, 204 can be configured to selectively absorb and/or reflect varying frequencies. Additionally, the patterns 202, 204 can include the superimposition of multiple layers having different characteristics to provide for multiple control signals with a single position of the drum 106 in relation to the sensors 112, 212. Accordingly, the technology disclosed herein can provide for complex engine monitoring and control via the patterns 202, 204.

In the embodiment of FIG. 2B, the drum 106 includes multiple patterns such as three separate patterns 204 and three separate sensors 212. The patterns 204 and the sensors 212 can correspond to different engine control functions or monitoring. For example, the first pattern 204A and the first sensor 212A can control fuel injection or ignition (similar to that discussed above with respect to FIG. 2A); the second pattern 204B and the second sensor 212B can control pressurized fuel tank operation (as will be described further below); and the third pattern 204C and the third sensor 212C can monitor engine performance. The tightly spaced third pattern 204C can provide an indication of engine performance to the engine monitoring system 215. The pattern 204C can include a large number of individual sections or portions that can give information on various engine parameters. For example, in multi-piston internal combustion engines, a loss of engine load can result in an acceleration, or a misfire of a combustion chamber can result in a negative acceleration or non-uniform rotation of the shaft 104, and consequently the drum 106. The sensor 212C can detect the sections of the pattern 204C and send signals to the engine monitoring system 215. The engine monitoring system 215 can analyze the signals to determine engine operating parameters (e.g., RPM, acceleration, deceleration, etc.) and provide an indication of any abnormal condition, and/or provide signals to other components. For example, in one embodiment, an indication that overall acceleration is below an expected value can result in the initiation of increased fuel pressure or a cleaning cycle for one or more spark plugs, as will be further described below.

In embodiments having the drum 106 driven in unison with a crank-shaft to control a four-stroke engine, one pattern can be utilized every other rotation for one or more fuel injection events and another pattern can be utilized every rotation for generation of one or more electrode cleaning operations between fuel ignition functions. In embodiments where the drum 106 is driven in unison with a crank-shaft to control a two-stroke engine, one pattern can be utilized every rotation for one or more fuel injection events and another pattern can be utilized every rotation for generation of one or more electrode cleaning operations between fuel ignition functions.

The operation of the engine control system 100 to control fuel injection and/or other engine systems can include multiple parameters. For example, increased torque or power can be provided by increasing the fuel injection pattern to a longer duration or "on-time" position, as described above. Alternatively increased power and torque may be provided by dynamically increasing the fuel pressure to provide the desired adjustment. In other instances combined adjustments of fuel pressure and fuel-injection duration can provide the desired performance outcome. Furthermore, the patterns 202, 204 can produce signals that correspond to differing actuation parameters. For example, in some embodiments, the signal produced by a pattern can provide varied voltages to produce proportional displacements by a piezoelectric actuator and thus vary the amounts of valve opening such that for a given amount of "on-time," a fuel injector can inject more or less fuel. Additionally, the signal can open a valve by differing amounts during a single "on-time." In one embodiment, two different colors in a single section of a pattern can correspond to a fuel injector valve being opened in two different amounts during a single "on-time."

Figure 3A:
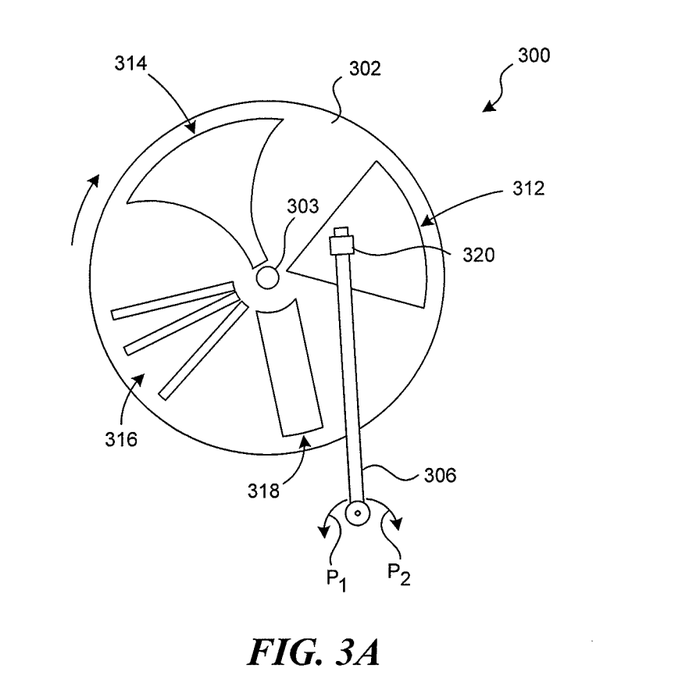
FIG. 3A is a partially schematic overhead view of an engine control system having a rotatable disk and configured in accordance with the present disclosure.
Figure 3B:
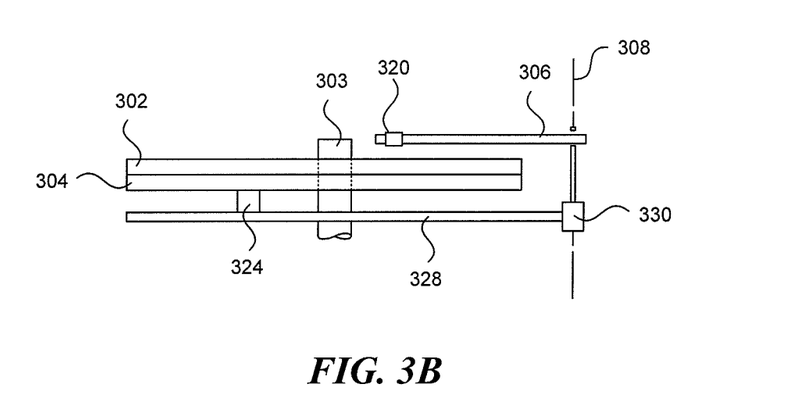
FIG. 3B is a partially schematic side view of an engine control system configured in accordance with the present disclosure.

FIGS. 3A and 3B are partially schematic overhead and side views, respectively, of an engine control system 300 having a rotatable first disk 302 configured in accordance with another embodiment of the present disclosure. In the illustrated embodiment, the first disk 302 rotates in unison with a crank or cam shaft 303 via a suitable direct or indirect connection. In the illustrated embodiment, four alternative patterns or maps 312, 314, 316, and 318 can be employed to control an engine. The maps 312, 314, 316 and 318 can be ferromagnetic and can be selected and actuated by various suitable arrangements, including the use of a permanent magnet in a second disk 304. The second disk 304 can be rotated to detent locations relative to the disk 302 to select an individual map. A Hall-effect device or sensor 320 on a movable arm 306 can read the map in a manner at least generally similar to that described above with respect to the engine control system 100 of FIGS. 1A-2B. In some embodiments, the sensor 320 can include a photoelectric reader, and a particular control map may be optically activated by a light source in the second disk 304 (e.g., a chemoluminescent reaction device, a fluorescent material, or an LED system).

The first disk 302 can move in unison with the cam shaft 303 and the second disk 304 can be momentarily retarded by a mechanical, electromagnetic, magnetostrictive, eddy-current coupler, or piezoelectric clutch 324 to provide quick selection of the desired control map and index the map to an appropriate detent for continued rotation with the first disk 302. Each combustion chamber of a multiple cylinder engine can have a corresponding movable arm 306 and Hall-effect sensor 320 that can be coordinated with an engine input mechanism, e.g., an acceleration peddle and/or cruise-control mechanism to provide fuel-injection, ignition control, etc. Engine control systems 100 and 300 can be constructed in a variety of suitable form factors, including small form factors that can fit within tight confines. In certain applications control systems 100 and/or 300 can fit within a cam or crank-shaft gear or timing wheel that is used for triggering conventional digital controllers. For example, engine control system 100 can be about the size of a sewing thimble or smaller. Engine control system 300 can be about the size of a nickel or smaller including thinner than dime-size first disks 302 and second disks 304 and a small gear and return spring assembly to rotate one or more arms 306 in the direction of P1 or P2 to provide fuel metering along with injection and ignition timing to control power adjustments. For example, the arm 306 can rotate in the direction of P2 to move from a first position proximate to the center of the disk to a second position proximate to the outer edge of the disk. As the arm moves from the first position to the second position, the sensor 320 reads different sections or portions of the maps 312, 314, 316 and 318. Various suitable gear drive systems including sun-and-planet, epicyclic, harmonic, caged, and other gear mechanisms may be used. In the embodiment of FIG. 3B, a gear 328 can drive smaller gear sectors such as 330 to rotate the arm 306 and the sensor 320 about an axis 308. Gear 328 can also support normally free clutch 324, as shown. In other embodiments, the arm 306 can be rotated via a linkage to an engine input mechanism (e.g., an accelerator). Additionally, although the illustrated embodiments of FIGS. 3A and 3B include two disks 302 and 304, other embodiments may include a single disk, or additional disks.

The patterns 202, 204 and/or the maps 312, 314, 316 and 318 can include a variety of suitable materials and can be created in a variety of manners. For example, in some embodiments, the patterns and/or the maps can be printed on a medium (e.g., glass, polymer film, paper, etc.) via a printer (e.g., an inkjet or laser printer) and the medium can be adhered to the drum 106 or the disk 302. Accordingly, the drum 106 and the disk 302 can include paper having one or more maps printed thereon. In some embodiments, signals generated by the patterns and/or maps can be used to create additional control patterns and/or maps. For example, the pattern 204C can be used to determine an appropriate time for an engine event (e.g., fuel injection) and signals from the sensor 212C can be directed to a computer or other device that can translate the signals into a pattern or map that can be used to control fuel injection.

In several embodiments, the engine control systems 100 and 300 can include sensors 112 and 320 that can erase and/or write data to form patterns on the drum 106 and/or the disk 302. For example, in one embodiment, the sensors 112 can comprise read/write heads that can read data from the patterns 202, 204 and a controller can direct the sensors 112 to erase an existing pattern and write a new pattern on the drum 106. Similarly, the sensor 320 can comprise a read/write head that can read and write patterns to the disk 302. In such embodiments, the engine control systems 100 and 300 can adaptively control the operation of an engine. For example, the pattern 204C can indicate that a particular cylinder or piston of an engine is not functioning properly, and the sensor 112 can erase an existing pattern and create a new pattern that adapts engine operation to minimize the effects of the malfunction.

Certain operational embodiments are particularly suited for operation with hydrogen-characterized fuels such as mixtures of hydrogen and carbon monoxide or hydrogen and nitrogen as typically produced by thermochemical regeneration of easily stored liquid fuels such as fuel alcohols, formic acid, ammonia and/or urea as generally characterized by illustrative Equations 1, 2 and 3. Thermochemical production of hydrogen and carbon monoxide from hydrocarbons and an oxygen donor such as water is shown in Equation 3. Endothermic energy such as $HEAT_1$, $HEAT_2$ and/or $HEAT_3$ can include heat sourced from the engine coolant or exhaust or from other sources such as regenerative braking of a vehicle.

$$CH_3OH + HEAT_1 \rightarrow CO + 2H_2 \quad \text{Equation 1}$$

$$2NH_3 + HEAT_2 \rightarrow N_2 + 3H_2 \quad \text{Equation 2}$$

$$C_XH_Y + XH_2O + HEAT_3 \rightarrow XCO + (0.5Y+X)H_2 \quad \text{Equation 3}$$

In internal combustion engines utilizing hydrogen fuel sources, there is a wider range of suitable fuel-air ratios and a much higher fuel combustion rate compared to engines fueled by hydrocarbons. Accordingly, in embodiments employing hydrogen fuel sources, the power level of the engine may be adjusted by control of the temperature and pressure of fuel delivery.

In certain applications with hydrocarbon fuels it is advantageous to overcome relatively slow combustion characteristics by Lorentz or magneto-plasma-dynamic MPD or magneto-hydro-dynamic (MHD) or magneto-ion-dynamic (MID) thrusting of oxidant during the last stages of the compression cycle to produce ionized oxygen, oxides of nitrogen, ozone, and/or various other ions and free radicals that are effective in displacing and/or oxidizing carbon-rich deposits on electrode surfaces of a combustion initiator (e.g., a sparkplug). This can produce a stratified charge thrust of activated oxidant within the oxidnt in the combustion chamber. Near, TDC fuel particles are ionized and accelerated into the stratified charge of activated oxidant by subsequent MID thrusting to produce greatly accelerated beginning and completion of combustion. in the engine control systems 100 and 300 of FIGS. 1A-3B with selection of the optimum signal maps including spacing of features of such signal maps that is driven by or at a multiple of crank shaft frequency and with one or more sensors 112 can first provide the timing for electrode cleaning and thrusting stratified charge oxidant into the combustion chamber followed by fuel ionization and acceleration into the stratified charge oxidant. Or an engine control system can include a signal pattern that can be driven at a multiple of crank shaft frequency to produce electrode-cleaning MID accelerations of oxidant during the intake, compression, and exhaust strokes and the same or another type of signal pattern can be operated at cam shaft frequency to provide fuel injection and ignition signals.

The critical temperature of a substance is the temperature at and above which vapor molecules of the substance cannot be liquefied regardless of how much pressure may be exerted. Critical pressure of a substance is the pressure at the critical temperature to cause vapor molecules to liquefy upon exchange of the latent heat of condensation. In other words at and above the critical temperature a fluid becomes vaporous and cannot be liquefied regardless of pressure.

Fluids can be pressurized to desired magnitudes by heat addition in accordance with operation of a pressurized fuel delivery system (as will be further described below). A substance in liquid state can be self-pressurized by heat addition to cause liquid expansion and further pressurized as additional heat is added and it becomes vaporous above the critical temperature and produces the critical pressure. Further pressurization can be developed by additional heat transfer to the vapor inventory.

Table 1 compares the critical temperature and pressure values of several fluids.

TABLE 1

| FLUID | FORMULA | CRITICAL TEMPERATURE | | CRITICAL PRESSURE | | K = Cp/CV |
|---|---|---|---|---|---|---|
| Air | $N_2 + O_2$ | −222° F. | −141° C. | 547 psia | 37.8 bara | 1.400 |
| Oxygen | $O_2$ | −182° F. | −119° C. | 730 psia | 50.4 bara | 1.400 |
| Nitrogen | $N_2$ | −233° F. | −147° C. | 492 psia | 34.0 bara | 1.400 |
| Hydrogen | $H_2$ | −400° F. | −240° C. | 188 psia | 13.0 bara | 1.410 |
| Carbon monoxide | CO | −218° F. | −139° C. | 514 psia | 35.5 bara | 1.404 |
| Carbon dioxide | $CO_2$ | 88° F. | 31° C. | 1072 psia | 74.0 bara | 1.300 |
| Ammonia | $NH_3$ | 270° F. | 132 ° C. | 1638 psia | 113 bara | 1.310 |
| Ethanol | $C_2H_5OH$ | 469° F. | 243 ° C. | 927 psia | 64.0 bara | 1.13 |
| Methane | $CH_4$ | −117° F. | −83° C. | 673 psia | 46.4 bara | 1.307 |
| Methanol | $CH_3OH$ | 464° F. | 240° C. | 1156 psia | 79.6 bara | 1.200 |
| Ethane | $C_2H_6$ | 90° F. | 32 ° C. | 717 psia | 49.5 bara | 1.220 |
| Propane | $C_3H_8$ | 207° F. | 97 ° C. | 617 psia | 42.6 bara | 1.131 |
| Butane | $C_4H_{10}$ | 307° F. | 153 ° C. | 529 psia | 36.5 bara | 1.096 |

The minimum pressure ratio between the absolute inlet pressure ($P_u$) and absolute outlet pressure ($P_d$) for producing speed-of-sound limited and thus constant flow (also sometimes called "choked" flow) for each of several fuels is listed in Table 2. The pressure ratio listed for each fuel produces flow at the speed of sound or Mach 1 through the orifice area and cannot be increased by increasing the pressure ratio. Thus when the ratio of the absolute upstream pressure ($P_u$) to the absolute downstream pressure ($P_u$) is equal to or greater than $[0.5(k+1)]^{k/k-1}$ the flow reaches sonic velocity and cannot be increased by additional pressure. The effective orifice size and thus the flow rates can be controlled by adjustments of the valves in a fuel injection device.

TABLE 2

| GAS | FORMULA | K = $C_p/C_v$ | SONIC VELOCITY MINIMUM $P_u/P_d$ |
|---|---|---|---|
| Hydrogen | $H_2$ | 1.410 | 1.899 |
| Carbon monoxide | CO | 1.404 | 1.895 |
| Ammonia | $NH_3$ | 1.310 | 1.838 |

TABLE 2-continued

| GAS | FORMULA | K = $C_p/C_v$ | SONIC VELOCITY MINIMUM $P_u/P_d$ |
|---|---|---|---|
| Methane | $CH_4$ | 1.307 | 1.837 |
| Ethane | $C_2H_6$ | 1.220 | 1.784 |
| Propane | $C_3H_8$ | 1.131 | 1.729 |
| Butane | $C_4H_{10}$ | 1.096 | 1.708 |

Figure 4A:
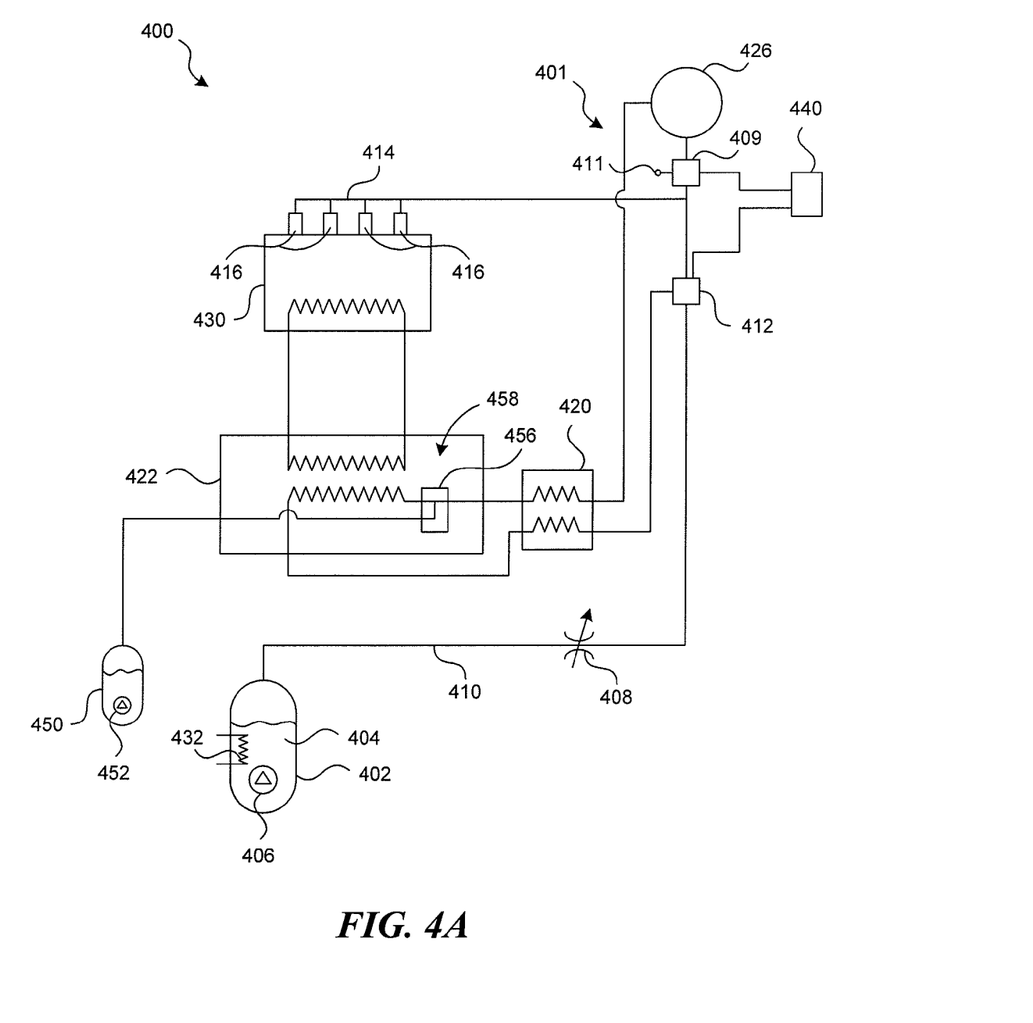
FIG. 4A is a schematic diagram of an engine system having a pressurized fuel delivery system and configured in accordance with the present disclosure.

FIG. 4A is a schematic diagram of an engine system 400 having a pressurized fuel delivery system 401 configured in accordance with an embodiment of the present disclosure. The engine system 400 can include an internal combustion engine 430 (e.g., a two stroke engine, a four stroke engine, a rotary engine, gas turbine, etc.). A liquid fuel 404 such as generally depicted by Equations 1, 2 and/or 3 can be stored in vessel 402 as shown in FIG. 4A. Delivery of liquids at high pressure can be provided by one or more intensifiers that utilize relatively low pressure gas or vapors to actuate a large piston that forces a much smaller piston to pressurize and deliver high pressure liquid to vessel or chamber 402. A liquid pump 406 or thermal pressurization by heat exchanger 432 can provide pressurization of fluid in vessel 402. Heat exchanger 432 may deliver heat to fluid 404 from the coolant and/or exhaust gases of engine 430 or it may deliver regenerative braking energy of a vehicle or otherwise produced electric energy, including grid energy in stationary applications. Fuel can be delivered to the engine 430 by a fluid line 410. A three-way valve 412 can be provided in-line with the fluid line 410, and the three-way valve 412 can be controlled by a controller 440 to adjust the flow of the fuel. The fuel can flow through a manifold 414 for metered distribution to the combustion chambers of the engine 430 such as by fuel injector and ignition devices 416 to provide stratified charge combustion in each combustion chamber in response to timing control by engine control systems 100 or 300 (FIGS. 1A-3B).

An endothermic reactor 422 can provide gas production by thermochemical regeneration as depicted in Equations 1, 2 and/or 3. The gas production can include a mixture of hot hydrogen and carbon monoxide that can be routed from endothermic reactor 422 and delivered to an accumulator 426. The hydrogen characterized fuel can travel through a heat exchanger 420 and heat fluid delivered from tank 402 that is also traveling through the heat exchanger. The accumulator 426 can be controlled manually, pneumatically or electronically by micro-controller 440 at a variable pressure controlled by one or more regulators such as a flow regulator 408, the three-way valve 412 and/or a valve 409 to produce the power level needed in accordance with fuel injection and ignition timing provided by operation of engine control system 100 or 300. The valve 409 can include a connection 411 to pressure from the endothermic reactor 422. One or more micro-controllers 440 may be housed at any convenient location including within the combination fuel injection and ignition devices 416 to enable finer adjustments of pressure and timing of fuel injection and ignition events in accordance with optimization of processes in each combustion chamber.

Similar control of the delivery of fluids to endothermic reactor 422 can be provided by interaction of controller 100 or 300 with the flow regulator 408 and the valve 412 and/or the pump 406. Control operational modes include emergency shut-off, adjusted continuous flow and adjusted pulsed or intermittent flows. Fail-safe shut off can be initiated by shut-off of an engine control valve or other signals such as deployment of crash-arrest air bags of a vehicle. Pulsed flows can be provided by a suitable signal pattern, e.g., pattern 204C of FIG. 2B (which may be continued through a complete rotation or for any portion of a 360° revolution) and can provide improved turbulence, heat transfer, and increased reaction rates for endothermic reactions such as summarized by Equations 1, 2, and 3.

In instances that reactions such as depicted generally by Equation 3 are performed by reactor 422, an oxygen donor such as water may be supplied from reservoir 450 by continuous or pulsed operation of a pump 452 in response to signals similar to pattern 204C or a version of such patterns to continue through a greater angular or circumferential interval subject to the relative position of signal reader or sensor 112. Such oxygen donor fluid and/or reactants such as shown in Equations 1 and 2 can be heated by exhaust gases and/or by electric energy such as may be provided by regenerative braking or a generator including types that operate in conjunction with a system for streamlining a vehicle. Sufficiently heated oxygen donor may then be mixed and reacted with a fuel fluid in zone 458 starting at mixer 456 as shown.

Systems that offer high overall efficiency and user convenience include preparation of fuel selections at a stationery facility in which primary feedstocks such as organic waste, biofuel, hydrogen sulfide, or natural gas is converted into a locally preferred transportation or off-road fuel such as methanol, ethanol, dimethylether, diethylether, ammonia, formic acid, cryogenic methane etc. Examples of such fuel preparation are disclosed in U.S. Provisional Patent Application No. 61/725,456, entitled "PLASMA POWER INJECTOR APPARATUS, METHOD OF MANUFACTURE AND OPERATION," and filed on Nov. 12, 2012; U.S. patent application Ser. No. 13/843,976, entitled "CHEMICAL FUEL CONDITIONING AND ACTIVATION," and filed on Mar. 15, 2013; and U.S. patent application Ser. No. 13/834,293, entitled "SYSTEM AND METHOD FOR PROVIDING CUSTOMIZED RENEWABLE FUELS AND SELECTED SUBSTANCES," and filed on Mar. 15, 2013; each of which is incorporated by reference herein in its entirety. In such applications, locally preferred transportation or off-road fuels are usually characterized as:

1) Cleaner burning than the feedstock. Illustratively, extracting carbon to produce durable goods from an organic feedstock along with hydrogen that is combined with nitrogen from the atmosphere to form carbon-free ammonia and/or utilizing a waste source of carbon dioxide that is combined with the hydrogen to produce urea, formic acid, methanol, ethanol, dimethylether, diethylether, or various carbazoles for zero net carbon dioxide production upon use.

2) Quickly transferred to fill on-board tanks on a vehicle including delivery trucks or rail tank cars.

3) At least "triple value" products that provide lower cost fuel to the end user, greater profit for the producer, greater environmental protection, and that produce sustainable economic development.

A difficult problem that such locally preferred fuels often present is that the tank that receives such fuels is difficult to "empty" for purposes such as realizing the full range or horsepower hours of operation. It is typical that only about 80% or 90% of fuels that start as gases or liquids that become gases through the course of emptying the fuel tank are available for use in conventional fuel delivery systems. Considerable opportunity costs including loss of operator and equipment productivity and convenience results from the problem of failure to empty storage tanks.

Figure 4B:
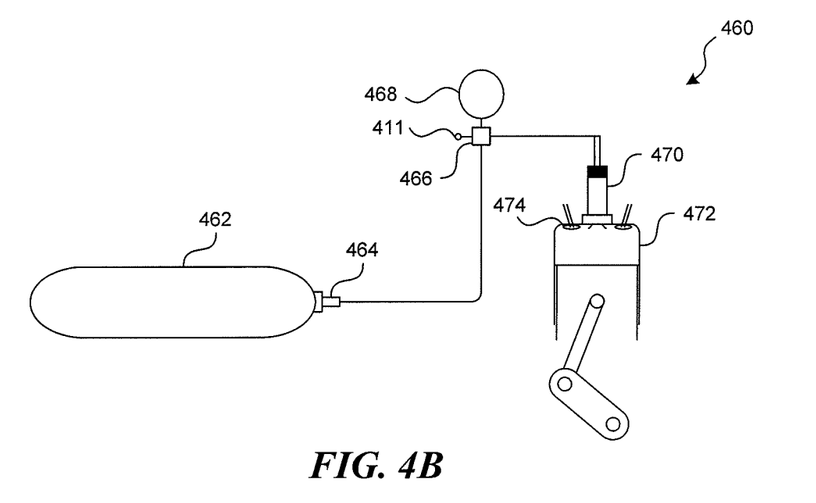
FIGS. 4B and 4C are partially schematic diagrams of tank regulation systems configured in accordance with the present disclosure.
Figure 4C:
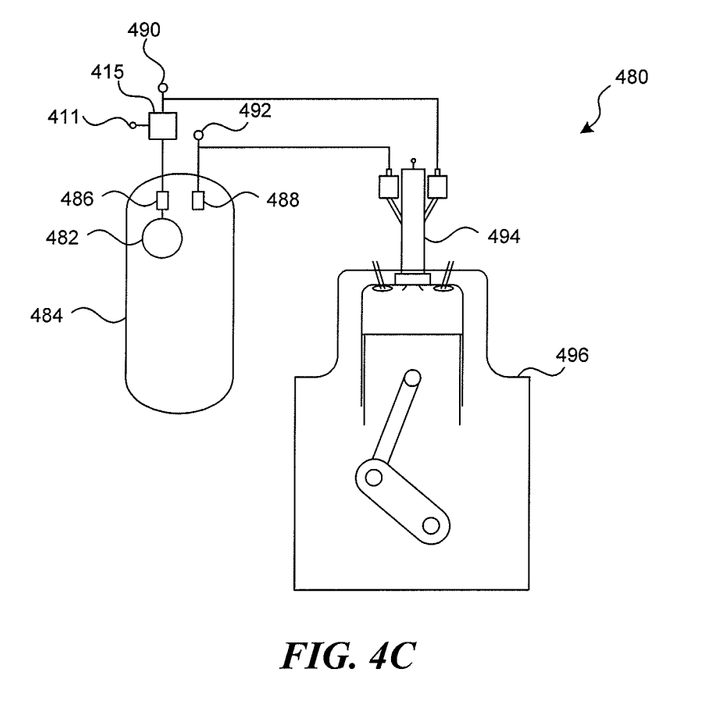

FIGS. 4B and 4C are partially schematic diagrams of tank regulation systems 460 and 480, respectively, configured in accordance with the present disclosure. The tank regulation systems 460 and 480 can be adapted to applications such as the engine system 400, along with the systems disclosed in U.S. Provisional Patent Application No. 61/725,456 and U.S. Patent Applications entitled "CHEMICAL FUEL CONDITIONING AND ACTIVATION," and "SYSTEM AND METHOD FOR PROVIDING CUSTOMIZED RENEWABLE FUELS AND SELECTED SUBSTANCES, which were incorporated by reference above. The illustrated embodiment 460 of FIG. 4B includes a storage tank 462 and a load tank 468. The storage tank 462 can deliver fuel to an injection device 470 that is operably coupled to an engine 472. In operation, at times that high pressure is available from storage tank 462, or from endothermic reactor 422 (FIG. 4A), load tank 468 can be charged by a suitable sub-system (e.g., the circuit including tank 462, a shut-off valve 464, and a four-way valve 466 that includes a connection 411 to pressure from the endothermic reactor 422) to load tank 468. The engine 472 can be operated with the highest pressure available from tank 462 and/or from endothermic reactor 422 to gain the advantage of utilizing such pressure in work production cycles by direct injection through a suitable device such as the injection device 470. At times that the pressure available from the storage tank 462 or endothermic reactor 422 drops below the optimum direct injection pressure during the power stroke of engine operation, four-way valve 466 continues to deliver fuel to injector 470 according to "range-extension" patterns presented by controller 100 or 300 to provide for earlier fuel injection toward the crank angle at bottom dead center (BDC) at the successively lower fuel injection pressure that is available to provide production of lean fuel-air mixtures in the combustion chamber of engine 472. Subsequently in the power stroke the lean fuel-air mixture is combusted by accelerated beginning and completion of combustion processes that follow shifting of four-way valve 466 to provide delivery from load tank 468 at high pressure of a relatively smaller portion of the fuel delivered as directly injected ionized fuel vectors that penetrate and develop combustion throughout an adaptively optimized stratified charge pattern in the lean fuel-air mixture.

Engine control systems 100 or 300 can provide such range-extension operation with fuel ratios from tank 468 as compared to fuel from tank 462 in the range of from about 0.5% at idle and cruise operation to about 10% to meet higher performance demands. Controller optimization patterns provided by engine control systems 100 or 300 can proportion the amount of fuel utilized and timing of each injection through injector device 470 to be commensurate with the pressures available from tank 462 and 468 for the purpose of nearly emptying both tanks to produce the greatest vehicle range, performance, fuel economy, convenience, and environmental protection. Depending upon the combustion chamber geometry, piston speed, and other characteristics of engine 472 such optimization may include subroutines to reduce the pressure in the combustion chamber by a modified Miller Cycle and/or effectively throttling the air entering the combustion chamber by variable operation of the oxidant control valve such as intake valve 474 to reduce the pressure at or before the bottom dead center position of crank rotation to enable the degree of emptying desired for tanks 462 and/or 468.

In the illustrated embodiment of FIG. 4C, the tank regulation system 480 includes a high pressure tank 482 integrated within a larger capacity tank 484. The tank 484 can include an impervious liner and high strength fiber composite reinforcement to contain high pressure fluid storage and to safely withstand severely abusive service events such as the blast of a full stick of dynamite, repeated bullet impingement from a 0.357 Magnum pistol, and a fire that causes the surface temperature to reach 1200° F. The tank regulation system 480 can include fail safe tank shut-off valves 486 and 488 that can be located within the protective shell that is provided by the tank 484. Pressure relief devices 490 and 492 can reduce the probability of fires or other heat sources producing tank pressures in excess of safety limits.

High pressure tank 482 can be pressurized at the highest pressure available at the time of refueling a gaseous fuel or at any time that a pump and/or thermal pressurization event provides an opportunity for increasing the pressure in high pressure tank 482. In some embodiments, the high pressure tank 482 is loaded with hydrogen or a mixture of hydrogen and another fuel at the time that the high pressure tank 482 and the tank 484 are re-filled, and/or at times that hydrogen characterized fuel is produced by the endothermic reactor 422 and loaded through a valve 415 via the connection 411 as shown. Utilization of such hydrogen-characterized fuel from the high pressure tank 482 is especially advantageous to enable maintenance of accelerated beginning and completion of combustion for high performance throughout the range-extension mode of vehicle operation. As provided by the disclosure in U.S. Patent Application entitled "SYSTEM AND METHOD FOR PROVIDING CUSTOMIZED RENEWABLE FUELS AND SELECTED SUBSTANCES," which was incorporated by reference above, a vehicle could be contacted by wireless interrogation to determine the optimum fuel selections for filling the high pressure tank 482 and the tank 484 to meet the driving style and duty cycles that are indicated by past use. This information can be presented to the operator as an option for the fuel and pressure selections along with other choices such as maximum range or minimum emissions for the refueling operation.

In some embodiments, the tank 484 can be filled with ammonia and the high pressure tank can be filled with high pressure hydrogen in order to achieve a desired performance level without emissions of carbon compounds such as carbon dioxide. In another embodiment that can include thermochemical regeneration (TCR, as described in regard to the endothermic reactor 422 of the engine system 400), the tank 484 can be filled with a black alcohol such as $CH_3OH$—$H_2O$—$C$ or $C_2H_5OH$-$2H_2O$—$C$ and the high pressure tank 482 can be filled with a mixture of ammonia and hydrogen.

Fluid fuel from tank 484 can be efficiently delivered by tank pressure to perform motive work in addition to combustion for heat generation in a piston engine such as represented by 496. As pressure diminishes in tank 484, engine control system 100 or 300 can provide range-extension operation with fuel ratios from tank 482 compared to fuel from tank 484 that may range from about 0.5% at idle and cruise operation to about 10% to meet performance demands. A fuel injection and/or ignition device 494 may provide two or more fuel-valve operations. Controller optimization patterns provided by engine control system 100 or 300 can proportion the amount of fuel utilized and timing of each injection through injector 494 to be commensurate with the pressures available from tank 484 and high pressure tank 482 for the purpose of nearly emptying both tanks to produce the greatest vehicle range, performance, fuel economy, convenience, and environmental protection.

Another related control function of the embodiments 100 or 300 improves turbo-expander operations including routines to empty tank 462 and/or 468 by progressive reduction of combustion chamber pressure at the very last stages of range-extension operation. However this may be off-set by delivery of relatively higher pressure fuel from tank 468 to enable proper engine performance that may be demanded through the range-extension process. During such range-extension processes greater heat transfer to combustion chamber surfaces may occur as a result of homogeneous charge combustion. Controller 100 or 300 also provides patterns for responding to such processes and operator demand for torque adjustment according to combustion chamber conditions, events, and temperature signals to provide fuel and/or coolant injection during the power and/or exhaust strokes of an engine such as 430 or 472 to the exhaust gases to increase the energy delivered to the turbo generator or charger as shown in FIG. 5A of U.S. Provisional Patent Application No. 61/725,456, which was incorporated by reference above.

Stationary engines driving synchronous loads such as electricity generators and cruise control of vehicles can be accomplished by selecting the desired frequency such as with an integrated frequency circuit or micro-computer and comparing the frequency of the engine's output shaft or a road speed according to a wheel frequency or GPS data. Devices suitable for detection of the engine's output shaft, axle or wheel frequency include photo-optical, inductive and Hall-effect sensors such as supplied by Honeywell, Cherry Electrical Products, or Allegro MicroSystems. The amount of fuel delivered and thus the acceleration or deceleration achieved to match the desired frequency is adaptively metered in proportion to the magnitude of error between the desired frequency and the measured frequency. In certain embodiments the fuel pressure can be adjusted by a regulator such as regulator valve 408 for speed corrections. In other embodiments speed control can be accomplished by a combination of fuel pressure variation along with variable timing of fuel injection initiation, duration and/or time between multiple injections as provided by engine control system 100 or 300. In other embodiments speed control can be accomplished by maintaining constant pressure for a given type of fuel and load condition along with variable timing of fuel injection initiation, duration and/or time between multiple injections as provided by engine control system 100 or 300.

Control system 100 or 300 can provide improved fuel efficiency and engine performance along with enabling much less expensive fuels to be utilized in place of gasoline and diesel fuels. An illustrative example includes retrofit applications on engines that have crank and/or camshaft angle sensors such as timing wheels and electronic control units (ECU)s for fuel metering and/or ignition and that include or interface with other electronic controls of functions such as air-conditioning, transmission shifting, windshield wiper operation, defrosting systems, anti-skid controls, power seats, entertainment systems, power windows, power door locks etc. In an illustrative retrofit embodiment the original timing wheels and/or camshaft and crank-position sensors and ECU are left in place along with sensors for conditions such as the exhaust and coolant temperature, ambient temperature, ambient pressure, oxygen concentration in the exhaust gases, knock sensors, boost pressure and throttle position etc. Such sensor data is recorded as are the corresponding ECU codes or commands for control of fuel delivery, ignition, and related engine functions.

Subsequently, system 100 or 300 is installed on the engine along with the appropriate relays and drivers, fuel injection and ignition units to provide fuel injection and ignition according to the information stored within their rotors for optimizing the subject engine in conjunction with direct injection and electronic ignition that may include various selections and/or combinations of spark, magneto-plasma-dynamic or MPD oxidant and/or fuel ion thrusting and/or corona discharge ignition including highly efficient stratified corona discharge to the projected ion pattern established by MPD. Engine operation is provided by system 100 or 300 and such related sub-systems including turbocharger boost control if available. All other electronic controls continue to be provided by the original ECU.

In addition, the original ECU is provided with appropriate selections of real and/or emulated condition data to allow it to remain viable for possible use as a back-up for engine control and the actual engine operating data including engine performance by analysis of brake mean effective pressure (BMEP), fuel rate, torque-RPM, curves, operating temperatures, and actual oxygen concentration in the exhaust gases although the original ECU will be provided with typical previously recorded data because in every mode of operation the new control regime by system 100 or 300 will provide higher air utilization efficiency and oxygen concentration in the exhaust gases.

Actual engine performance under control by system 100 or 300 is then compared to the emulated engine performance on the original ECU, and a log is made to analyze and determine if various additional control functions such as transmission shift point control or more sophisticated turbocharger boost control would be advantageous. If so additional control functions are added to one or more pattern maps in the appropriate rotors of system 100 or 300 and may be made by read-write capabilities or by replacement of rotors to provide such improvements as the situation indicates. From the foregoing, it will be appreciated that specific embodiments of the invention have been described herein for purposes of illustration, but that various modifications may be made without deviating from the spirit and scope of the various embodiments of the invention. For example, several embodiments may include various suitable combinations of components, devices and/or systems from any of the embodiments described herein. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

I claim:

1. An engine control system comprising:
a drum operably coupled to a rotating shaft of an engine, the drum having a surface, wherein the surface includes a pattern having a first portion and a second portion, and wherein the first portion corresponds to a first engine event and the second portion corresponds to a second engine event;
a spring positioned to bias the drum in a first direction;
a rod operably coupled to an engine input mechanism and positioned to urge the drum in a second direction, opposite to the first direction; and
a sensor positioned proximate to the drum and configured to detect the pattern, wherein movement of the drum moves the pattern between a first position with the first portion of the pattern adjacent to the sensor and a second position with the second portion of the pattern adjacent to the sensor.

2. The engine control system of claim 1 wherein the first engine event corresponds to idling of the engine, and wherein the second engine event corresponds to an increase in engine speed.

3. The engine control system of claim 1 wherein the sensor comprises an optical sensor, wherein the pattern includes a first color and a second color, wherein the first color corresponds to a first fuel type, and wherein the second color corresponds to a second fuel type.

4. The engine control system of claim 1 wherein the pattern is a first pattern, wherein the sensor is a first sensor, and wherein the engine control system further comprises:
a second pattern positioned on the surface of the drum, the second pattern comprising a plurality of individual sections;
a second sensor positioned proximate to the drum and configured to detect the second pattern; and
an engine monitoring system configured to receive signals from the second sensor and determine engine operating parameters.

5. The engine control system of claim 4 wherein the engine monitoring system is further configured to provide an indication of an abnormal engine condition.

6. The engine control system of claim 1 wherein the first portion of the pattern includes a continuous portion, wherein the second portion of the pattern includes a discontinuous portion having multiple sections, and wherein movement of the pattern from the first position to the second position corresponds to a change from single-burst fuel injection to multi-burst fuel injection.

7. The engine control system of claim 1, further comprising a controller operably coupled to the sensor and configured to control an ignition device, wherein the controller receives signals from the sensor and sends corresponding signals to the ignition device.

8. The engine control system of claim 1, further comprising a controller operably coupled to the sensor and configured to control a fuel injector, wherein the controller receives signals from the sensor and sends corresponding signals to the fuel injector.

9. The engine control system of claim 1, further comprising:
a first fuel tank;
a second fuel tank;
a valve operably coupled to the first fuel tank and the second fuel tank; and
a controller operably coupled to the sensor and to the valve, wherein the controller receives signals from the sensor, and wherein the controller sends signals to the valve to control fuel flow from the first fuel tank and from the second fuel tank.

10. An engine control system comprising:
a disk operably coupled to a rotating shaft of an engine, the disk having a center and an outer edge, wherein the disk includes a map having a plurality of portions, and wherein the map corresponds to at least one engine event;

a rotatable arm operably coupled to an engine input mechanism and positioned proximate to the disk, wherein operation of the engine input mechanism rotates the arm between a first position proximate to the center of the disk and a second position proximate to the outer edge; and a sensor fixedly attached to the arm and configured to read the map, wherein movement of the arm between the first position and the second position moves the sensor between different portions of the pattern.

11. The engine control system of claim 10 wherein positioning of the map proximate to the sensor corresponds to an on-time, and wherein movement of the arm from the first position to the second position corresponds to a change in the on-time.

12. The engine control system of claim 11, further comprising a controller operably coupled to the sensor and configured to control a fuel injector, wherein the change in the on-time corresponds to a change in the duration of a fuel injection.

13. The engine control system of claim 11, further comprising a controller operably coupled to the sensor and configured to control an ignition device, wherein the change in the on-time corresponds to a change in the timing of an ignition event.

14. The engine control system of claim 10 wherein the disk is a first disk, wherein the engine control system further comprises a second disk releasably coupled to the rotating shaft, wherein the second disk comprises a magnet, and wherein the second disk is operable to activate the map.

15. The engine control system of claim 14 wherein the map is a first map, wherein the first disk includes a second map, and wherein the second disk is operable to activate the second map.

16. The engine control system of claim 10 wherein the map is printed on paper, and wherein the paper is adhered to the disk.

17. A method for controlling an engine, the method comprising:

operably coupling a drum to a rotational component of an engine, wherein the drum includes a surface having a pattern, wherein the pattern includes a first portion and a second portion, and wherein the drum is linearly moveable between a first position and a second position;

positioning a sensor adjacent to the drum, wherein the sensor is adjacent to the first portion of the pattern when the drum is in the first position, and the sensor is adjacent to the second portion of the pattern when the drum is in the second position;

coupling the sensor to a controller;

detecting the pattern with the sensor;

sending signals to the controller from the sensor; and adjusting the operation of an engine component based on the signals.

18. The method of claim 17 wherein adjusting the operation of an engine component includes adjusting the timing of fuel injection.

19. The method of claim 17 wherein adjusting the operation of an engine component includes adjusting the timing of an ignition event.

20. The method of claim 17 wherein detecting the pattern includes detecting a frequency of light reflected by the pattern.

* * * * *